(12) United States Patent
Landgraf et al.

(10) Patent No.: US 9,046,063 B2
(45) Date of Patent: Jun. 2, 2015

(54) VEHICLE AIR INTAKE SYSTEM

(75) Inventors: Michael Marvin Landgraf, Huntingdon Woods, MI (US); Joseph Matthew McCann, Plymouth, MI (US); Thanh Pham, Canton, MI (US); Robert Steven Thomas, Brighton, MI (US); Thomas Eric Svenson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 421 days.

(21) Appl. No.: 12/493,863

(22) Filed: Jun. 29, 2009

(65) Prior Publication Data

US 2010/0326756 A1    Dec. 30, 2010

(51) Int. Cl.
| | |
|---|---|
| *B60K 13/02* | (2006.01) |
| *F02M 35/04* | (2006.01) |
| *F02M 35/10* | (2006.01) |
| *F02M 35/16* | (2006.01) |
| *B60K 11/04* | (2006.01) |

(52) U.S. Cl.
CPC ............ *F02M 35/04* (2013.01); *Y10T 29/49428* (2015.01); *B60K 11/04* (2013.01); *B60K 13/02* (2013.01); *F02M 35/10013* (2013.01); *F02M 35/161* (2013.01)

(58) Field of Classification Search
CPC ........ B60K 11/00; B60K 11/02; B60K 11/04; B60K 11/06; B60K 11/08; B60K 13/00; B60K 13/02; B60K 13/06
USPC ............... 180/68.1, 68.2, 68.3, 68.4, 68.6
See application file for complete search history.

(56) References Cited

U.S. PATENT DOCUMENTS

| | | | | |
|---|---|---|---|---|
| 4,420,057 A * | 12/1983 | Omote et al. | ................. | 180/68.3 |
| 4,597,603 A * | 7/1986 | Trabert | ....................... | 296/193.1 |
| 5,251,712 A * | 10/1993 | Hayashi et al. | .............. | 180/68.3 |
| 5,810,896 A | 9/1998 | Clemens | | |
| 6,035,955 A | 3/2000 | Suzuki | | |
| 6,880,655 B2 * | 4/2005 | Suwa et al. | ................... | 180/68.1 |
| 6,994,738 B2 | 2/2006 | Taddey | | |
| 2005/0230162 A1 | 10/2005 | Murayama | | |
| 2006/0006012 A1 | 1/2006 | Khouw | | |
| 2007/0022978 A1 | 2/2007 | Kanbara | | |
| 2008/0242213 A1 | 10/2008 | Mayer | | |
| 2010/0038161 A1 * | 2/2010 | Laakso | ......................... | 180/68.3 |

FOREIGN PATENT DOCUMENTS

| | | |
|---|---|---|
| JP | 2001277867 | 10/2001 |
| JP | 2007285191 | 11/2007 |
| JP | 2008068731 | 3/2008 |

* cited by examiner

*Primary Examiner* — John Walters
(74) *Attorney, Agent, or Firm* — Raymond L. Coppiellie; Brooks Kushman P.C.

(57) ABSTRACT

The present disclosure relates to air intake systems and methods for manufacturing the same. Systems include an air inlet that defines a slope equal to a vertical distance between a surface of a fascia shield and a surface of the engine intake channel, divided by a longitudinal distance between the shield and engine intake channel. Unwanted moisture and debris is filtered from the engine intake channel.

12 Claims, 6 Drawing Sheets

VEHICLE AIR INTAKE SYSTEM

TECHNICAL FIELD

The present disclosure relates to vehicle fluid intake systems that draw air into the vehicle engine and methods for manufacturing the same.

BACKGROUND

Conventional vehicles include air intake systems that supply air to an internal combustion engine. The primary function of many air intake systems is to maximize airflow required for power generation or cooling. Some intake systems also supply filtered air for positive crankshaft ventilation, idle and/or air diverters. For internal combustion engines air is routed through a vehicle grill and into the air filter assembly.

Under certain conditions water, snow and other particles can enter the air intake system and degrade functionality and performance. Air flow can be significantly restricted. Snow build up can cause vehicle power loss and stalling.

Some of the prior art attempts to solve these problems by generating an S-shaped or serpentine air flow underneath the vehicle hood. For example, U.S. Pat. No. 7,237,635 published as U.S. Patent Application No. 2006/0006012 on Jan. 12, 2006 to Khouw et al. teaches the use of a serpentine air flow. Applicants discovered that this configuration creates turbulence in the incoming air stream and can lead to losses in air flow and engine power. U.S. Pat. No. 7,237,635 also teaches utilizing screens and seals in the air intake system in order to filter out particles in the air. These additional parts increase the overall costs of the air intake system, moreover, they can also lead to greater losses and/or inefficiencies in managing air flow to the engine. Moreover, snow, ice and other particles can build up on screens to effectively reduce the amount of air flow to the engine.

Therefore it is desirable to have an air intake system that reduces the amount of unwanted particles flowing through to the engine. It is also desirable to have an air intake system that efficiently manages air flow and minimizes the amount of additional parts required for the system.

SUMMARY

The present invention may address one or more of the above-mentioned issues. Other features and/or advantages may become apparent from the description which follows.

Certain embodiments of the present invention provide an air intake system, including: a hood; an engine intake channel positioned underneath the hood and attached to an air filter system; a fascia positioned with respect to the hood; a shield coupled to the fascia; and an air inlet defined by a bottom surface of the shield and a bottom surface of the engine intake channel. The air inlet defines a slope equal to a vertical distance between the bottom surface of shield and the bottom surface of the engine intake channel, divided by a longitudinal distance between the shield and engine intake channel.

In another embodiment of the present invention there is provided a vehicle fluid intake system, include: a hood; an engine intake channel positioned underneath the hood and attached to an air filter system; a fascia positioned with respect to the hood; a fluid inlet defined by a surface of the fascia and a surface of the engine intake channel; and a heat exchanger positioned longitudinally behind of the fluid inlet.

In yet another embodiment of the present invention provided is a method for manufacturing an air intake system for drawing air into a vehicle engine. The method includes: forming an engine intake channel configured to be placed underneath a hood of the vehicle and in fluid communication with the vehicle engine; providing a fascia configured to be placed longitudinally in front of the engine intake channel; and forming a fluid inlet at least partially defined by a surface of the fascia and a surface of the engine intake channel, whereby air can travel through the fascia and the fluid inlet to the engine intake channel. The forming the fluid inlet includes defining a slope in the fluid inlet by a vertical distance between the surface of fascia and the surface of the engine intake channel, divided by a longitudinal distance between the surface of the fascia and engine intake channel.

One advantage of the present air intake systems is that they reduce the amount of snow, ice and unwanted particles that are able to flow into an air filter assembly and the engine manifold. A novel air inlet is designed and positioned to enable air to flow through while particles fall shy of the engine intake channel.

One of the advantages of the present air intake systems is that they facilitate a substantially direct air flow path from the front of the vehicle to an engine intake channel so as to minimize inefficiencies that are germane to contorted air flows.

Another advantage of the present air intake system is that it does not require the use of additional parts such as seals and screens to substantially reduce snow build up and particle ingestion into the engine manifold.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

Figure 1:
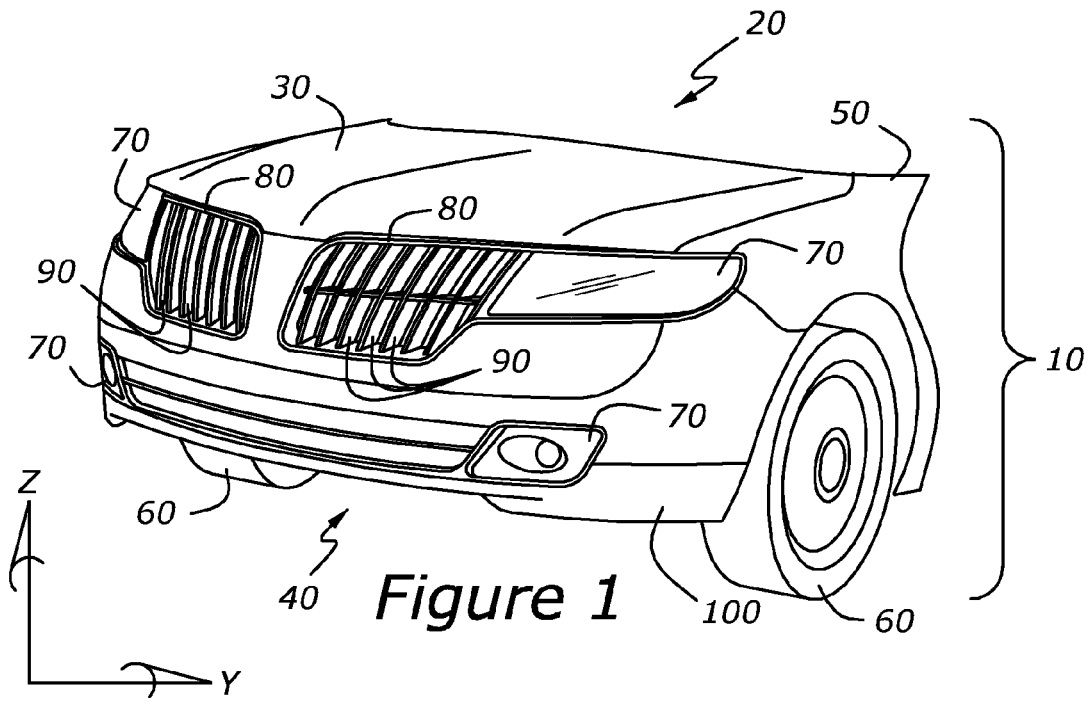
FIG. 1 is a perspective view of a vehicle with a fluid intake system according to an exemplary embodiment of the present invention.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, FIGS. 1-10, wherein like characters represent the same or corresponding parts throughout the several views there is shown various air or fluid intake systems for automobiles. The intake systems direct air from a front fascia or grill of the vehicle into an engine manifold. Various power sources can be utilized and in fluid communication with the air intake system including internal combustion engines, fuel cells and battery packs. Likewise the engine intake channels discussed herein can be intake channels for fuel cells, battery packs and/or other power sources used with automobiles.

Referring now to FIG. 1, there is shown a perspective view of a front section of an automobile 10 having an air intake system 20 in accordance with an exemplary embodiment of the present invention. The front section of the vehicle 10 includes a vehicle hood 30 that covers a vehicle engine (not shown) and a vehicle intake chamber 40 having an air intake system. The vehicle intake chamber 40 is further defined by a body side panel 50 of the vehicle straddling the front wheels 60. The front section of the vehicle 10 also includes the front lighting system 70 having headlamps and fog lamps. A front fascia 80 or grill is positioned with respect to the vehicle hood 30. Fascia 80 includes passenger and driver side portions. In the shown embodiment, the front fascia 80 includes a plurality of ribs 90 that extend vertically with respect to the vehicle 10. Ribs 90 in front fascia 80 assist in keeping larger debris and particles outside of the vehicle intake chamber 40. As the vehicle moves forward air travels through the front fascia 80 and into the air intake system along a longitudinal axis, Y, as shown in FIG. 1, of the vehicle.

Figure 2:
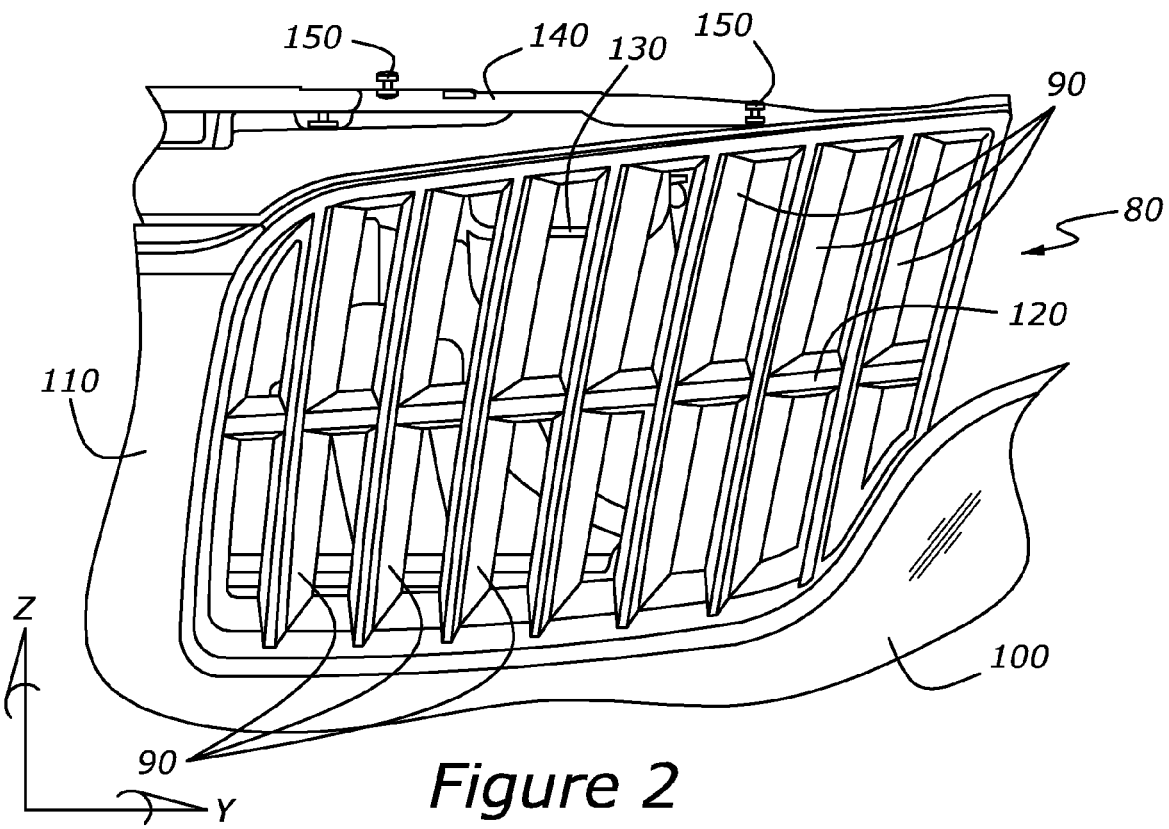
FIG. 2 is a front view of the vehicle shown in FIG. 1.

The driver side portion of the front fascia 80 of FIG. 1 is highlighted in FIG. 2. Front fascia 80 includes a body panel 100 that partially defines the front section of the vehicle 10. A hood support 110 extends between the passenger and driver side portions of the fascia 80. The ribs 90 in fascia 80 extend substantially vertically, or along the Z-axis as shown in FIG. 1. Rib 120 also traverses the lateral axis, Y, of the vehicle; fascia 80 includes a rib 120 that extend horizontally with respect to the front end of the vehicle 10. Fascia 80 encloses the front end of the vehicle intake chamber 40, as shown in FIG. 1. An engine intake channel 130 is positioned behind the fascia 80 so as to receive a portion of the air flowing through the fascia. Fascia 80 includes a shield 140 or support that extends laterally across the front section of the vehicle 10. Shield 140 restricts air flow underneath the hood 30 and into the vehicle intake chamber 40. In the illustrated embodiment, shield 140 is attached or coupled to fascia 80 and other vehicle components via fasteners 150. Fasteners 150 can be, e.g., rivets, screws, nuts and bolts, welds, glued connections and/or other affixing features within the art. In another embodiment, shield 140 is an extension of fascia 80 and can be formed with fascia.

Figure 3:
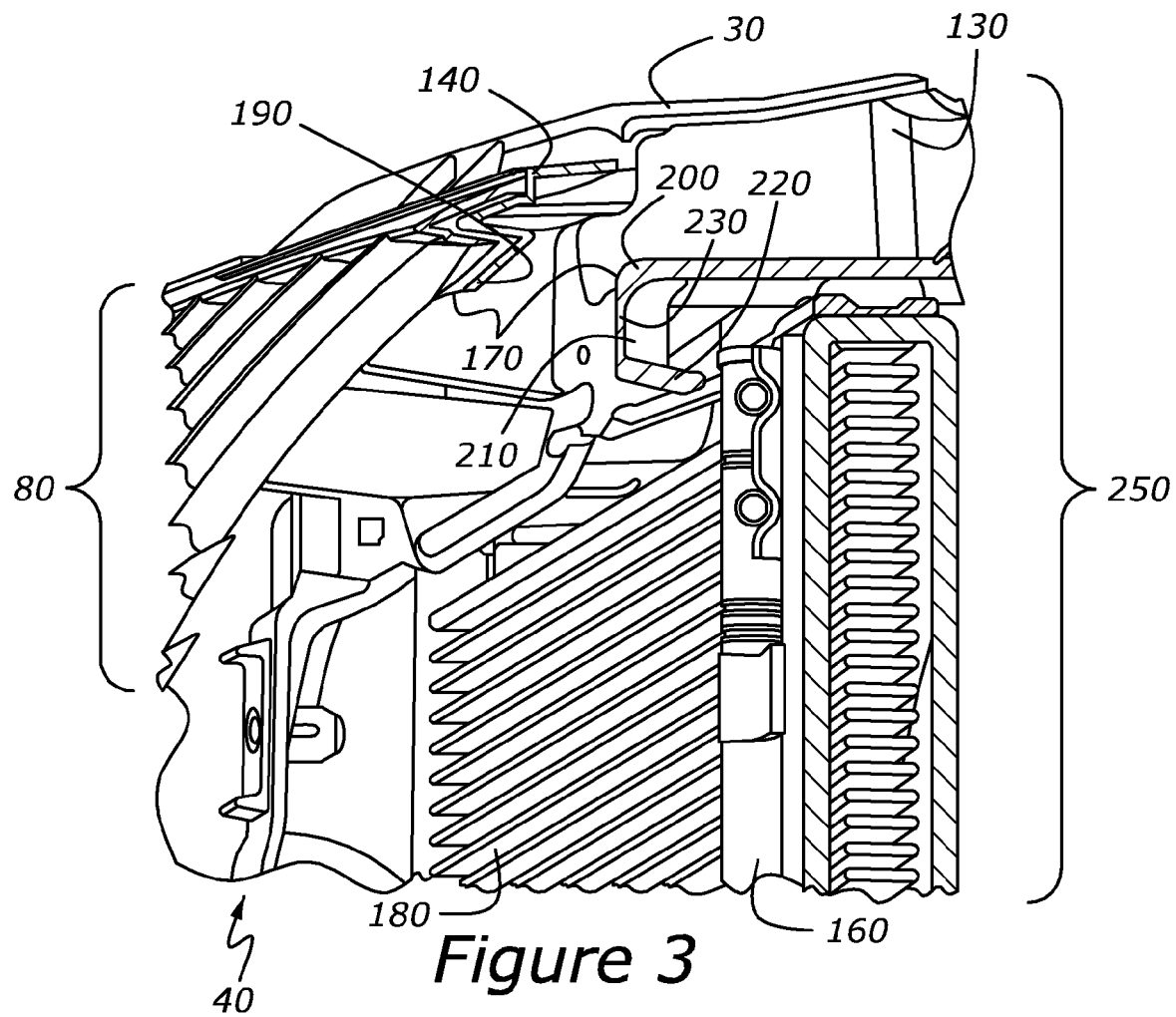
FIG. 3 is a perspective view of a fluid intake system in the vehicle shown in FIG. 1.
Figure 5:
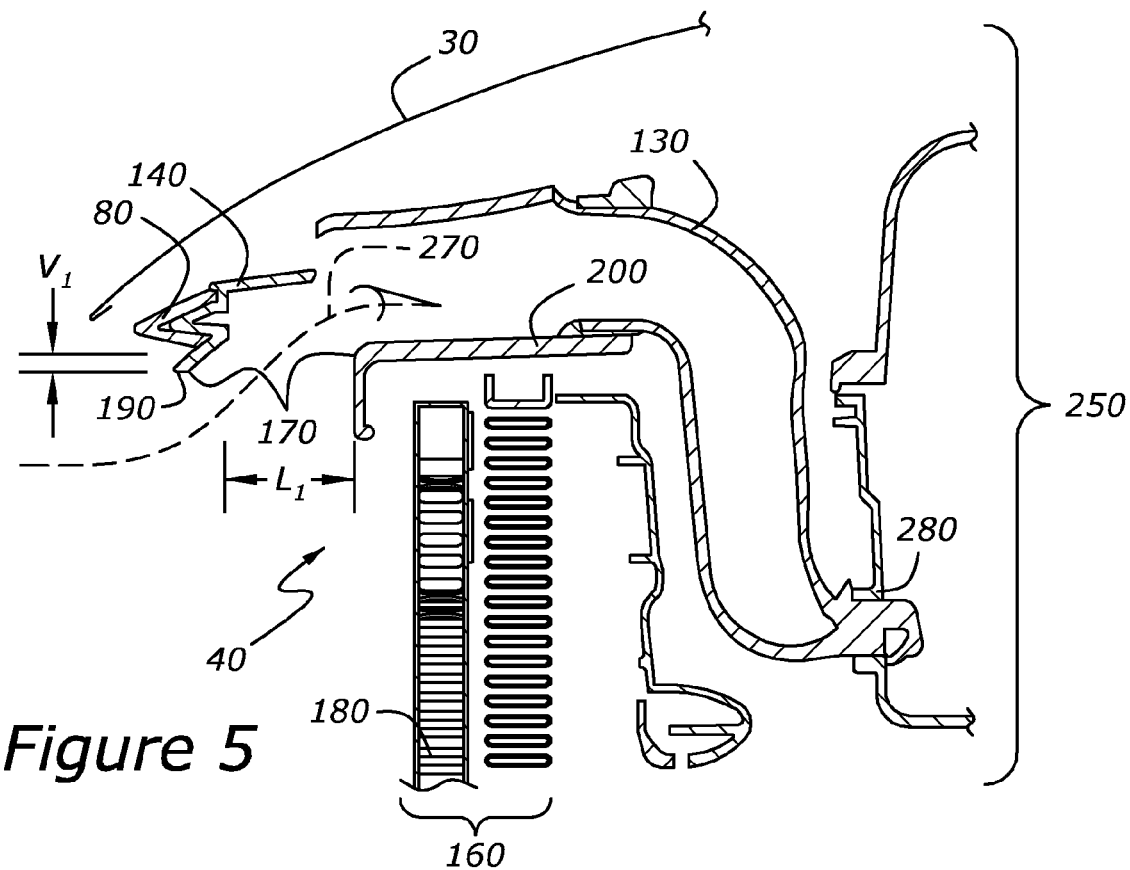
FIG. 5 is a cross-sectional view of the fluid intake system of FIG. 3.

Referring now to FIG. 3, there is shown a perspective view of the vehicle intake chamber 40 as discussed in reference to FIGS. 1 and 2. The vehicle intake chamber 40 is underneath the vehicle hood 30 and longitudinally behind the front fascia 80. Shield 140 is shown coupled to an upper portion of the fascia 80. The chamber 40 includes a heat exchanger 160. In the shown embodiment, the heat exchanger 160 is a condenser or radiator. The engine intake channel 130 is partially shown. The engine intake channel 130 is attached to an air filter system (e.g., 280 as shown in FIG. 5).

An air or fluid inlet 170 is also shown in FIG. 3. The air inlet 170 is defined by a surface of the shield 140 (attached to the front fascia 80 as shown herein) and a surface of the engine intake channel 130. Air inlet 170 is the opening or orifice through which air enters into the engine intake channel 130. Air inlet 170 is positioned longitudinally in front of heat exchanger 160, as also shown in FIG. 5. In one embodiment, heat exchanger 160 is at least 10 millimeters longitudinally behind air inlet 170. In another embodiment, heat exchanger 160 is 2 millimeters longitudinally behind the air inlet 170. In a different embodiment, the heat exchanger 160 is positioned 15 millimeters longitudinally behind the air inlet 170. The aft position of the heat exchanger 160 reduces the propensity for snow and ice to enter the engine air inlet 170. By placing the condenser 180 and heat exchanger 160 longitudinally behind the air inlet 170, the air flow from the front fascia 80 is more direct than traditional contorted or s-shaped flows and unwanted snow and ice naturally fall away from the inlet 170 and toward the heat exchanger 160.

As shown in FIG. 3, air inlet 170 defines a slope with a predetermined angular disposition that assists in separating unwanted snow, moisture and debris from the engine intake channel 130. The term "slope" is utilized, in part, to quantify the shield 140 located in front of the air inlet 170. A larger slope value will provide better coverage against snow intrusion. Air inlet 170 defines a slope that is equal to a vertical distance between a surface of shield and a surface of the engine intake channel, divided by the longitudinal distance between the shield and engine intake channel. In the illustrated embodiment of FIG. 3, the slope of the air inlet 170 is defined, in part, by a bottom surface 190 of the shield 140 and a bottom surface 200 of the engine intake channel 130. The slope characteristics of the air inlet 170 create a fluid flow that absorbs less snow and moisture than non-sloped designs.

The engine intake channel 130 comprises a ledge 210 coupled thereto and configured to extend the intake channel toward the front fascia 80. Ledge 210 can be coupled to engine intake channel 130 via any known fastening or attachment scheme. The engine intake channel 130 extends longitudinally across the heat exchanger 160. Ledge 210 includes a longitudinally extending surface 220 and a vertically extending surface 230. Longitudinally extending surface 220 partially covers the heat exchanger 160. Vertically extending surface 230 covers a portion of the front end of the heat exchanger 160. Vertically extending surface 230 acts as a shield to the upper portion of the heat exchanger 160.

Figure 4:
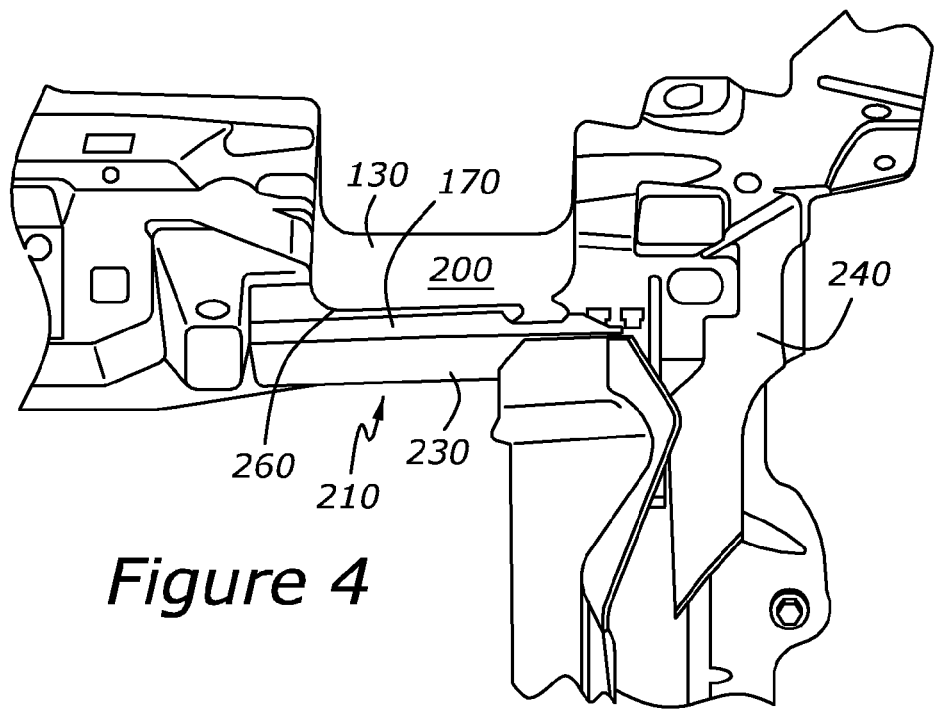
FIG. 4 is a perspective view of a ledge and fluid channel from the fluid intake system of FIG. 3.

As shown in FIG. 4, ledge 210 extends the engine intake channel 130 and can be separable from the engine intake channel. FIG. 4 shows a structural member 240 configured to extend laterally across a front portion of a vehicle. In the illustrated embodiment, ledge 210 extends 40 mm outboard of structural member 240 and engine intake channel 130. Ledge 210 effectively extends the engine intake channel 130 and air inlet 170 forward the heat exchanger 160 (shown in FIG. 3). The snow's inertia causes large amounts to be directed underneath the air inlet 170 and through the heat exchanger 160 instead of into the air intake system 250. Engine intake channel 130 is at least partially formed in structural member 240 at 260. Ledge 210 is shown welded onto the existing structural member 240. In this manner ledge 210 can be affixed as an aftermarket revision to a vehicle intake channel 130 to improve the vehicle air intake system 250. Ledge 210 can be custom fitted per vehicle components and features. In the embodiment shown in FIG. 4, ledge 210 includes a surface that extends vertically 230 and is positioned perpendicularly with respect to a longitudinally extending surface 200 of the engine intake channel 130. Ledge 210 can also include additional surfaces, shapes and textures. For example, in one embodiment, surface includes a lip and a jagged surface finish to increase turbulence at the air inlet 170. Ledge 210 is composed of a metallic material such as an aluminum alloy. Other material selections are compatible with the air intake system 250 such as, e.g., steel, hard plastics, and resins.

Referring now to FIG. 5, there is shown therein a cross-sectional view of a front section of the vehicle and air intake system 250 shown in FIG. 3. The cross-sectional view of FIG. 5 shows the vehicle intake chamber 40 defined by the vehicle hood 30 and front fascia 80. Front fascia 80 includes a number of vertically extending ribs, not shown. As the vehicle travels forward, air flows through the front fascia 80 and takes the flow path 270 as shown in FIG. 5. The air flow path 270 extends from the front fascia 80 and through the air inlet 170. The air inlet 170 has an angled opening so that the rearward portion of the air inlet is vertically lower than the frontward portion of the air inlet. This sloped design guides the flow path upward and away from the heat exchanger 160 and into the engine intake channel 130. Air travels into the air filter system 280. Flow path 270 is a direct flow path as the longitudinal thrust behind the air is not significantly diverted but continues into the engine intake channel 130.

As previously discussed, air inlet 170 also defines a slope or orifice with a predetermined angular disposition that assists in filtering unwanted moisture and debris from the engine intake channel 130. The slope that is equal to a vertical distance between a surface of shield 190 and a surface of the engine intake channel 200, $V_1$, divided by the longitudinal distance between the shield and engine intake channel, $L_1$. In the illustrated embodiment of FIG. 5, the slope of the air inlet 170 is defined, in part, by the bottom surfaces of the shield 190 and engine intake channel 200. The slope of the air inlet 170 is greater than zero as the bottom surface of the engine intake channel 200 (or longitudinal surface of the ledge) is positioned vertically higher than the position of the bottom surface of the shield 190. The slope is equal to 0.13. In another embodiment, slope is greater than 0.4. In another embodiment, slope is greater than 1.3.

Figure 6:
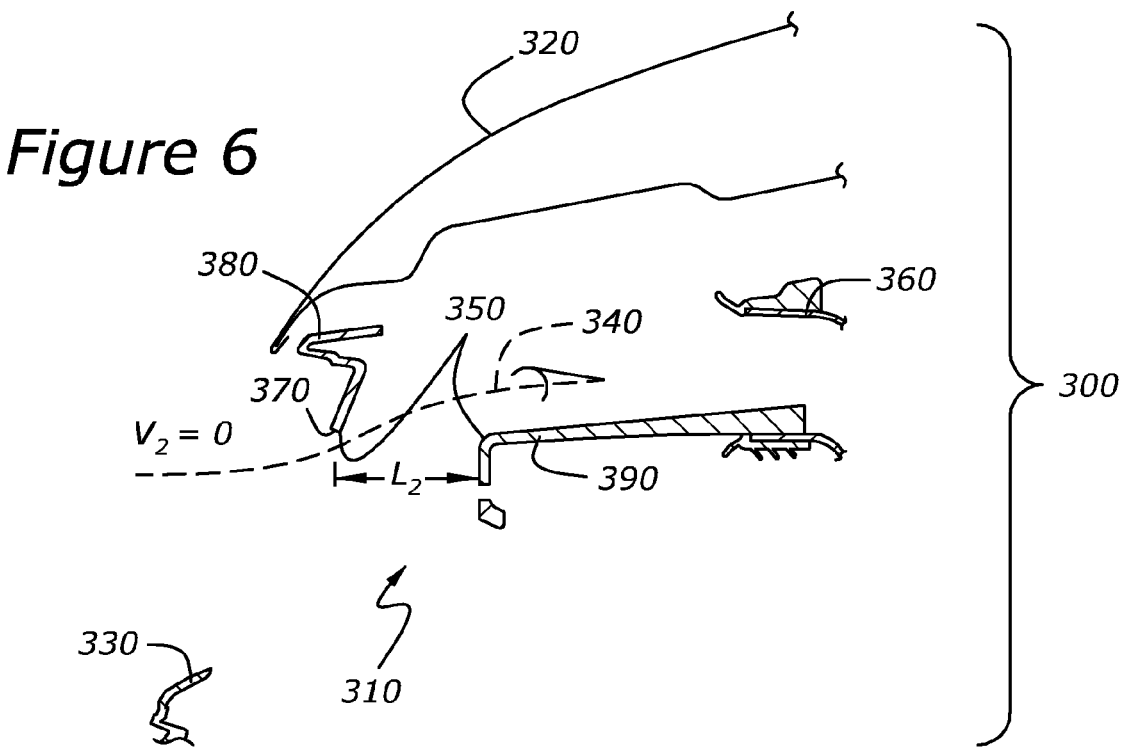
FIG. 6 is a cross-sectional view of an exemplary fluid intake system with an air inlet defining a zero degree slope.

Referring now to FIG. 6, there is shown another embodiment of an air intake system 300. Shown is a cross-sectional view of a front section of the vehicle. The cross-sectional view of FIG. 6 illustrates a vehicle intake chamber 310 defined by the vehicle hood 320 and front fascia 330. Front fascia 330 includes a number of vertically extending ribs, not shown. As the vehicle travels forward air flows through the front fascia 330 and takes the flow path 340 shown in FIG. 6. The air flow path 340 extends from the front fascia 330 and through the air inlet 350. Air travels into the air filter system (not shown). Air inlet 350 defines a slope or orifice with a predetermined angular disposition that assists in filtering unwanted moisture and debris from an engine intake channel 360. The slope that is equal to a vertical distance between a surface 370 of shield 380 and a surface 390 of the engine intake channel 360, $V_2$, divided by the longitudinal distance between the shield 380 and engine intake channel 360, $L_2$. In the illustrated embodiment of FIG. 6, the slope of the air inlet 350 is defined, in part, by the bottom surfaces 370, 390 of the shield 380 and engine intake channel 360. The slope of the air inlet 350 is zero as the bottom surface 370 of the shield 380 is positioned vertically on the same plane as the position of the bottom surface 390 of the engine intake channel 360.

Figure 7:
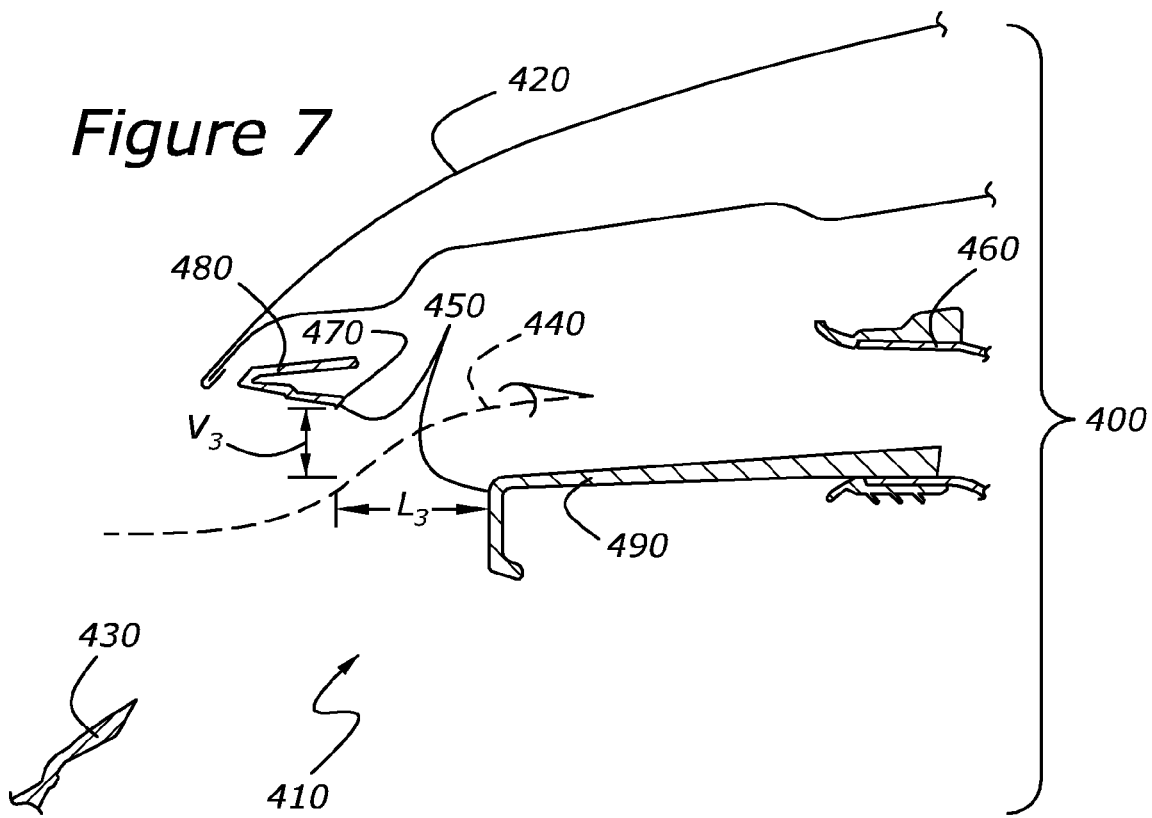
FIG. 7 is a cross-sectional view of an exemplary fluid intake system with an air inlet defining a negative slope.

Referring now to FIG. 7, there is shown another embodiment of an air intake system 400. There is shown therein a cross-sectional view of a front section of the vehicle. The cross-sectional view of FIG. 7 shows a vehicle intake chamber 410 defined by the vehicle hood 420 and front fascia 430. Front fascia 430 includes a number of vertically extending ribs, not shown. As the vehicle travels forward air flows through the front fascia 430 and takes the flow path 440 shown in FIG. 7. The air flow path 440 extends from the front fascia 430 and through the air inlet 450. Air travels into the air filter system (not shown). Air inlet 450 defines a slope or orifice with a predetermined angular disposition that assists in filtering unwanted moisture and debris from an engine intake channel 460. The slope that is equal to a vertical distance between a surface 470 of shield 480 and a surface 490 of the engine intake channel 460, $V_3$, divided by the longitudinal distance between the shield 480 and engine intake channel 460, $L_3$. In the illustrated embodiment of FIG. 7, the slope of the air inlet 450 is defined, in part, by the bottom surfaces 470, 490 of the shield 480 and engine intake channel 460. The slope of the air inlet 450 is negative as the bottom surface 470 of the shield 480 is positioned vertically higher than the position of the bottom surface 490 of the engine intake channel 460.

Figure 8:
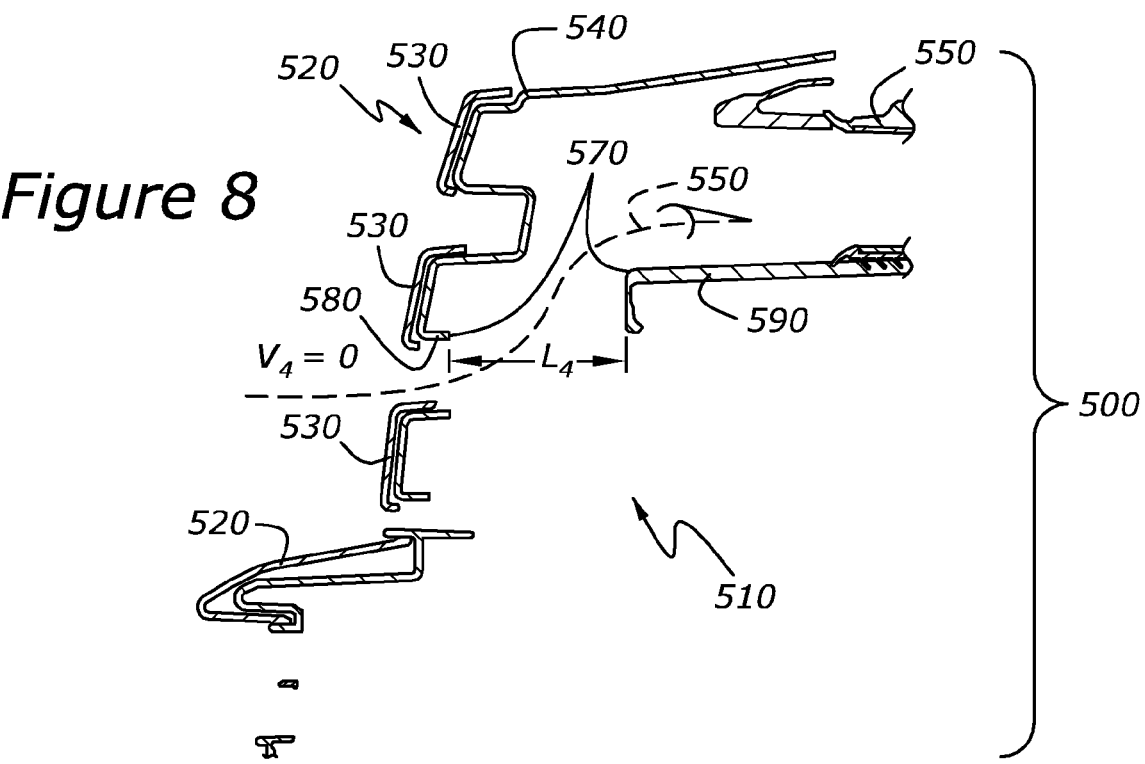
FIG. 8 is a cross-sectional view of a fluid intake system having a horizontal bar arrangement according to another exemplary embodiment of the present invention.

Referring now to FIG. 8, there is shown a side view of another embodiment of an air intake system 500. There is shown therein a cross-sectional view of a front section of the vehicle. The cross-sectional view of FIG. 8 shows a vehicle intake chamber 510 defined by the vehicle hood (not shown) and front fascia 520. Front fascia 520 includes a number of horizontally extending ribs 530, as shown in FIG. 8. A shield 540 is attached to an upper portion of the fascia 520. Shield 540 blocks air flow into an engine intake channel 550 through upper ribs 530. As the vehicle travels forward air flows through the front fascia 520 and takes the flow path 560 as shown in FIG. 8. The air flow path 560 extends from the front fascia 530 and through the air inlet 570. Air travels into the air filter system (not shown). Air inlet 570 defines a slope or orifice with a predetermined angular disposition that assists in filtering unwanted moisture and debris from the engine intake channel 550. The slope that is equal to a vertical distance between a surface 580 of shield 540 and a surface 590 of the engine intake channel 550, $V_4$, divided by the longitudinal distance between the shield 540 and engine intake channel 550, $L_4$. In the illustrated embodiment of FIG. 8, the slope of the air inlet 570 is defined, in part, by the bottom surfaces 580, 590 of the shield 540 and engine intake channel 550. The slope of the air inlet 570 is positive as the bottom surface 580 of the shield is lower vertically than the position of the bottom surface 590 of the engine intake channel.

Figure 9:
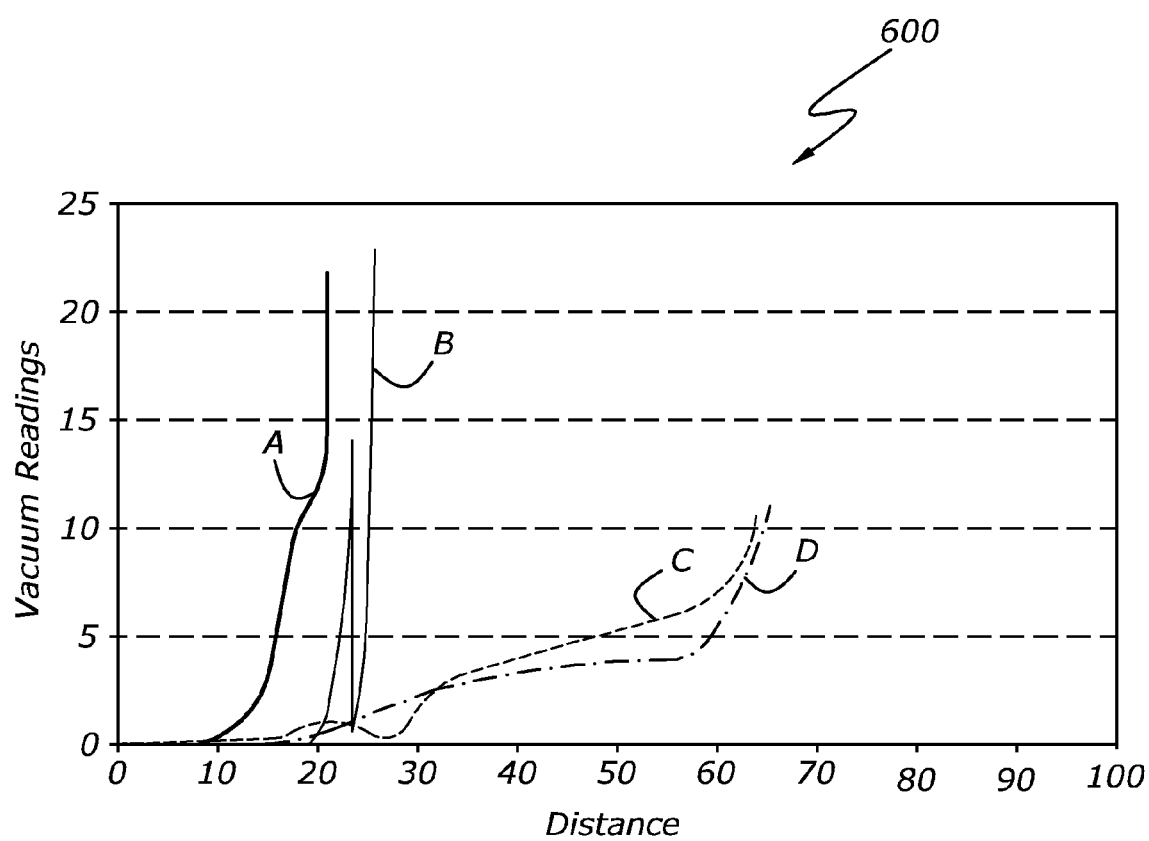
FIG. 9 is a graph showing fluid intake readings for various fluid intake systems.

FIG. 9 illustrates a graph 600 showing measurements from a vacuum tap positioned downstream of the air filter. Increasing vacuum readings is undesirable as increased readings indicate air flow restriction and performance degradation. Lines A-B are associated with prior art designs. Lines A-B illustrate the vacuum quickly reaching levels in excess of 20 units over the distance traveled. Lines C and D illustrate the performance of air intake systems according to two embodiments of the present invention. Unpredictably, the systems of Lines C and D travel substantially farther before reaching high ingestion readings; systems of Lines C and D travel 60 miles before approaching an intake of 10 units. Systems of Lines C and D substantially reduce the amount of unwanted particles that enter the engine intake channel.

Figure 10:
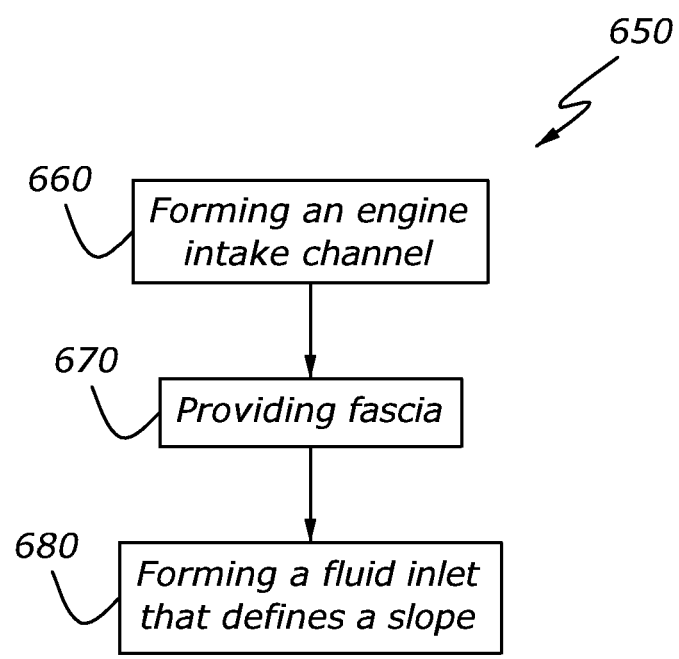
FIG. 10 is a block diagram illustrating a method of manufacturing an air intake system in accordance with an exemplary embodiment of the present invention.

FIG. 10 illustrates a method 650 for manufacturing an air intake system for drawing air into a vehicle engine. The method 650 includes: forming an engine intake channel configured to be placed underneath a hood of the vehicle and in fluid communication with the vehicle engine 660; providing a fascia configured to be placed longitudinally in front of the engine intake channel 670; and forming a fluid inlet at least partially defined by a surface of the fascia and a surface of the engine intake channel 680; whereby air can travel through the fascia and the fluid inlet to the engine intake channel. The forming the fluid inlet 680 includes defining a slope in the fluid inlet defined by a vertical distance between the surface of fascia and the surface of the engine intake channel, divided by a longitudinal distance between the surface of the fascia and engine intake channel.

In other embodiments, the method includes defining a slope that is greater than zero. In one embodiment, the method includes defining a slope that is greater than 0.1. In another embodiment, the method includes installing a heat exchanger underneath the hood, the heat exchanger positioned longitudinally behind at least a portion of the fluid inlet. In one embodiment, the heat exchanger is positioned 15 millimeters or less behind the fluid inlet.

Calculating the slope of an air/fluid inlet can be done according to a number of processes. In one embodiment a slope is determined according to the structural features of other components in the vehicle. First a determination is made as to the structural characteristics of a front fascia—whether the fascia has vertical or horizontal ribs. A determination of the design requirements for the heat exchanger position follows. In one embodiment, a threshold placement for the heat exchanger is 15 mm from the air/fluid inlet. An algorithm for calculating slopes is as follows: a) if the fascia has horizontal ribs and the heat exchanger is positioned greater than 15 mm front the air inlet the slope must be greater than 0.1; b) if the fascia has horizontal ribs and the heat exchanger is positioned less than 15 mm, slope must be greater than 0.4; c) if the fascia has vertical ribs and the heat exchanger is positioned greater than 15 mm form the air inlet, slope must be greater than 0.4; d) if the fascia has vertical ribs and the heat exchanger is positioned less than 15 mm from an air inlet, the slope must be greater than 1.3. If a required slope does not exist a fascia or ledge can be extended to define a functional slope. Another algorithm determines slope based on empirical data.

The air intake system disclosed here can be manufactured and assembled using existing forming techniques, e.g., casting, milling, or lathing. Shields, ledges, and engine intake channel can be composed of, e.g., an aluminum alloy, plastics, or steel.

It will be apparent to those skilled in the art that various modifications and variations can be made to the methodologies of the present disclosure without departing from the scope of its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

We claim:

1. An air intake system, comprising:
    an engine intake channel that receives an air flow and is positioned underneath a hood and above a radiator;
    a shield having a bottom below the intake;
    a ledge projecting forward from the channel and including a vertical surface; and
    an inlet for the channel defined between the bottom and the vertical surface, wherein the air flow after entering through a front fascia must travel upwardly to enter the channel.

2. The air intake system of claim 1 wherein the engine intake air flow follows an air flow path that is a direct flow path in a longitudinal direction that is not significantly diverted as the engine air flow continues from the front fascia into the engine intake channel.

3. The air intake system of claim 1 wherein the ledge further includes a longitudinally extending surface connected between the channel and the vertical surface.

4. The air intake system of claim 1 wherein the air flow includes a volume of snow that is directed underneath the fluid inlet and is not directed into the engine intake channel.

5. The air intake system of claim 4 wherein the volume of snow passes below the vertical surface to the radiator.

6. An air intake system comprising:
    a front fascia including a plurality of ribs and a shield projecting from the plurality of ribs;
    a fluid inlet disposed behind the front fascia; and
    an engine air inlet channel longitudinally aligned with the fluid inlet and above the fluid inlet, wherein a portion of a flow of air through the front fascia is an engine inlet air flow that flows longitudinally and upwardly from the fascia, directly through the fluid inlet, and into the engine air inlet channel, wherein the fluid inlet is defined by an inner surface of the shield and a lower surface of the engine air inlet channel.

7. The air intake system of claim 6 in combination with a vehicle, wherein as the vehicle travels forward, the air flowing through the front fascia to the fluid inlet includes a plurality of particles and is configured to permit air flow to the engine air inlet channel while causing the particles to fall shy of the engine air inlet channel.

8. The air intake system of claim 7 wherein the engine inlet channel further comprises a ledge that includes a longitudinally extending surface and a vertical surface, wherein the plurality of particles further comprise snow that is directed underneath the fluid inlet and through a heat exchanger.

9. The air intake system of claim 8 wherein the snow is not directed into the engine air inlet channel.

10. The air intake system of claim 6 wherein the engine inlet air flow follows an air flow path that is a direct flow path in a longitudinal direction that is not significantly diverted as it continues into the engine inlet channel.

11. An air intake system comprising:
    a front fascia including a plurality of ribs and a shield, the front fascia cooperating with a vehicle body panel to define a vehicle intake chamber, the shield projecting from the ribs toward the vehicle intake chamber;
    an engine intake channel configured to receive engine intake air flow and being positioned underneath a hood and above a heat exchanger; and
    a fluid inlet defined by an inner surface of the shield and a surface of the engine intake channel, wherein the fluid inlet is configured to direct a portion of a flow of air through the front fascia longitudinally and upwardly from the front fascia into the engine intake channel.

12. The air intake system of claim 11, wherein the fluid inlet extends longitudinally and vertically between the inner surface of the shield and the surface of the engine intake channel with a ratio of vertical extension to longitudinal extension being at least 0.1.

* * * * *